United States Patent
Akiyama

(10) Patent No.: US 8,355,152 B2
(45) Date of Patent: Jan. 15, 2013

(54) IMAGE FORMING APPARATUS, SETTING OPERATION SUPPORT METHOD AND SETTING OPERATION SUPPORT PROGRAM

(75) Inventor: Atsushi Akiyama, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 979 days.

(21) Appl. No.: 12/402,691

(22) Filed: Mar. 12, 2009

(65) Prior Publication Data

US 2009/0231618 A1   Sep. 17, 2009

Related U.S. Application Data

(60) Provisional application No. 61/036,565, filed on Mar. 14, 2008.

(51) Int. Cl.
    *G06F 3/12*        (2006.01)
    *G06K 15/00*       (2006.01)
    *G06F 15/16*       (2006.01)
    *G06F 15/173*      (2006.01)

(52) U.S. Cl. .......... 358/1.15; 358/1.13; 358/1.16; 358/1.17; 358/1.18; 709/224; 709/225; 709/201; 709/203

(58) Field of Classification Search .......... None
See application file for complete search history.

(56) References Cited

U.S. PATENT DOCUMENTS

| | | | | |
|---|---|---|---|---|
| 2002/0144023 A1* | 10/2002 | Kawabuchi et al. | | 710/5 |
| 2004/0085900 A1* | 5/2004 | Nishio | | 370/230 |
| 2005/0066051 A1* | 3/2005 | Miwa et al. | | 709/233 |
| 2005/0141018 A1* | 6/2005 | Oak et al. | | 358/1.15 |
| 2005/0198277 A1* | 9/2005 | Wada et al. | | 709/224 |
| 2005/0267989 A1* | 12/2005 | Yamamoto | | 709/245 |
| 2007/0047549 A1* | 3/2007 | Park | | 370/392 |
| 2007/0171468 A1* | 7/2007 | Tanji | | 358/1.15 |
| 2010/0073138 A1* | 3/2010 | Suzuki et al. | | 340/10.1 |

FOREIGN PATENT DOCUMENTS

| | | |
|---|---|---|
| JP | 2007-053703 | 3/2007 |
| JP | 2007-329876 | 12/2007 |

* cited by examiner

*Primary Examiner* — Satwant Singh
(74) *Attorney, Agent, or Firm* — Turocy & Watson, LLP

(57) ABSTRACT

The present invention provides a technique to support a setting operation as to a processing performed using identification information of a communication terminal on an associated network, in the communication terminal connected via the network.

The present invention enables a processor to conduct a collecting of identification information for individually identifying communication terminals communicably connected via a network, on the network; obtains identification information collected by the collecting; and registers the obtained identification information as identification information of communication terminals which are management targets.

17 Claims, 6 Drawing Sheets

FIG. 4

```
C:\> arp -a

Interface: 10.151.167.113  ---  0x500023
  Internet Address      Physical Address      Type
  10.151.167.1          00-e0-63-98-eb-3d     dynamic
  10.151.167.34         00-1a-67-96-ev-xd     dynamic
  10.151.167.5          00-f0-87-9i-e7-io     dynamic
  10.151.167.65         00-65-4f-c8-bn-2w     dynamic
  10.151.167.100        00-gh-j8-1f-ll-9p     dynamic
  10.151.167.113        00-2f-17-hj-gp-n6     dynamic
  10.151.167.122        00-1s-a5-77-6t-4r     dynamic
  10.151.167.124        00-y7-0o-p1-sd-ax     dynamic
  10.151.167.200        00-5c-ze-am-5k-1c     dynamic
  10.151.167.231        00-9b-x3-44-1a-x8     dynamic
```

FIG. 6

```
C:¥> netsh interface ipv6 show neighbors

Interface 6 : LAB

Internet Address              Physical Address      Type
  fe80::20f:crr:feav:8dd1       03-e4-63-98-eb-3d     Permanent
  fe44::1                       03-e4-63-98-eb-3d     Permanent
  fe56::2rz:qar:jek9:vdnm       03-e4-63-98-eb-3d     Stale(router)
  fe71::5:56e:hjov:1dv5         03-e4-63-98-eb-3d     Permanent
  fd00::1:20q:cff:vhhz          03-e4-63-98-eb-3d     Permanent
```

IMAGE FORMING APPARATUS, SETTING OPERATION SUPPORT METHOD AND SETTING OPERATION SUPPORT PROGRAM

CROSS-REFERENCE TO RELATED APPLICATION

This application is based upon and claims the benefit of priority from: U.S. provisional Application 61/036,565, filed on Mar. 14, 2008, the entire contents of which are incorporated herein by reference.

TECHNICAL FIELD

The present invention relates to a technique to support a setting operation as to a processing performed using identification information of a communication terminal on an associated network in the communication terminal connected via the network.

BACKGROUND

Conventionally, in an image forming apparatus, a filtering technique (so-called, IP Filter, MAC Filter or the like) is known, which allows or limits a specific processing on the basis of identification information (for example, an IP address, an MAC address etc.) of a communication terminal on a network, the communication terminal being communicably connected to a corresponding image forming apparatus via the network.

When a filtering is performed based on the above-described identification information, a terminal such as the image forming apparatus and the like needs to register the identification information for specifying a communication terminal which is a target of the filtering.

The registration of the identification information is typically conducted manually, and, in an environment having a number of communication terminals which are management targets such as a company or the like, entering identification information of a communication terminal which is a filtering target and so forth is a heavy work load.

In addition, knowledge for collecting identification information of such communication terminal is also required in grasping the identification information of a communication terminal which is a filtering target and so forth, and the above-described registration is also a heavy work load from such viewpoint.

SUMMARY

The embodiments of the present invention is directed to providing a technique to support a setting operation as to a processing performed using identification information of a communication terminal on an associated network, in the communication terminal connected via the network.

In order to solve the above-described problems, an aspect of the present invention relates to an image forming apparatus including: a collecting control unit configured to enable a processor to conduct a collecting of identification information for individually identifying communication terminals communicably connected via a network, on the network; an identification information obtaining unit configured to obtain identification information collected by the collecting; and an identification information registering unit configured to register the identification information obtained by the identification information obtaining unit as identification information of communication terminals which are management targets.

In addition, an aspect of the present invention relates to a setting operation support method including: enabling to conduct a collecting of identification information for individually identifying communication terminals communicably connected via a network, on the network; obtaining identification information collected by the collecting; and registering the obtained identification information as identification information of communication terminals which are management targets.

An aspect of the present invention relates to a setting operation support program enabling a computer to: enable the processor to conduct a collecting of identification information for individually identifying communication terminals communicably connected via a network, on the network; obtain identification information collected by the collecting; and register the obtained identification information as identification information of communication terminals which are management targets.

DESCRIPTION OF THE DRAWINGS

FIG. 4 is a view to illustrate an example of identification information obtained by an identification information obtaining unit 102 according to the first embodiment;

FIG. 6 is a view to illustrate an example of identification information obtained by an identification information obtaining unit 102 according to a second embodiment.

DETAILED DESCRIPTION

Hereinafter, embodiments of the present invention will be described with reference to the accompanying drawings.

(First Embodiment)

A first embodiment of the present invention will now be described.

Figure 1:
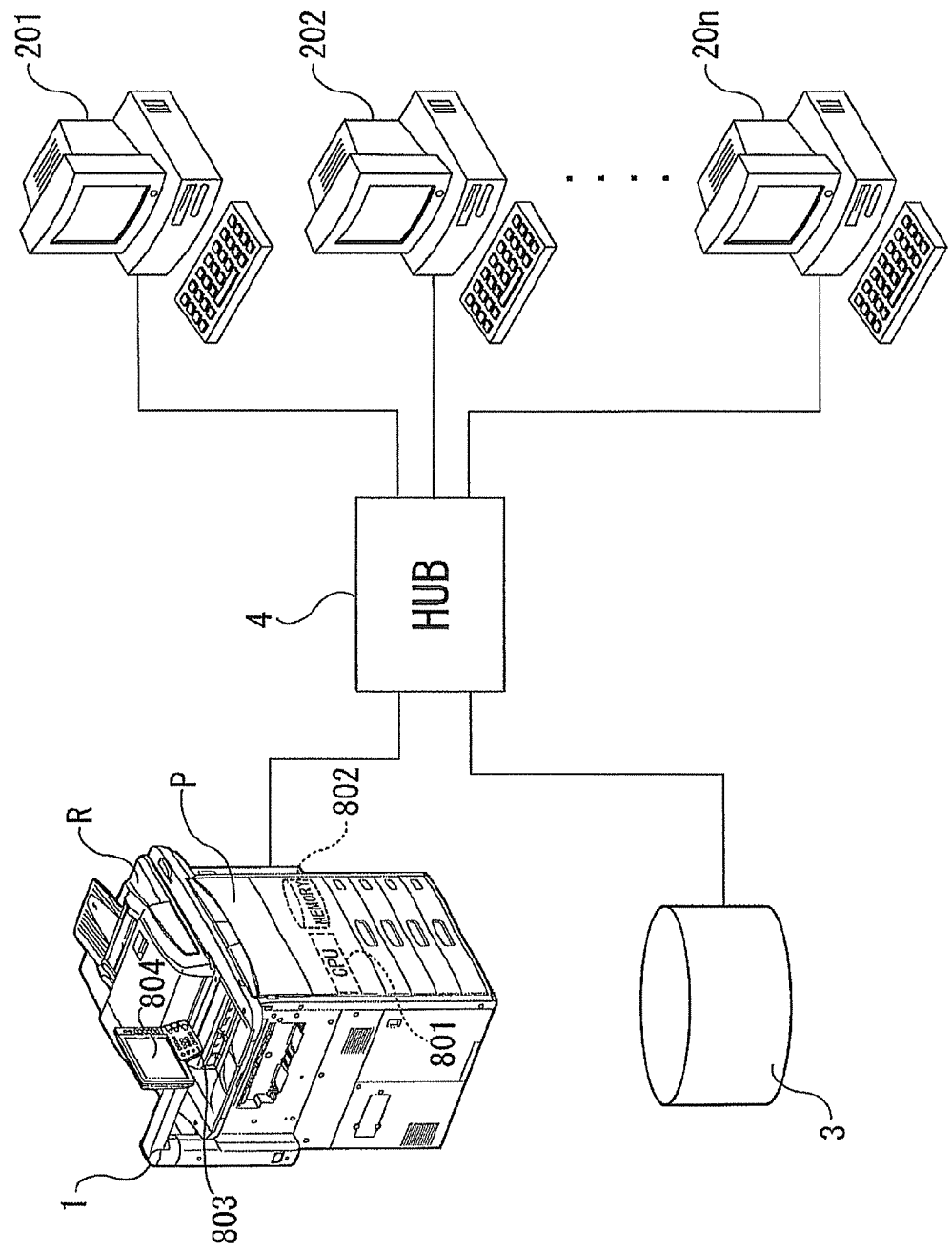
FIG. 1 is a view to illustrate a configuration of a network system including an image forming apparatus equipped with a setting operation support device according to a first embodiment of the present invention.

FIG. 1 is a view to illustrate a configuration of a network system including an image forming apparatus equipped with a setting operation support device according to the first embodiment of the present invention.

The network system shown in FIG. 1 includes an image forming apparatus 1, a plurality (herein, 'n') of communication terminals 201, 202, . . . , and 20n communicably connected to the image forming apparatus 1 via a HUB 4, and a database 3.

The image forming apparatus 1 can communicate with a plurality of communication terminals 201, 202, . . . , 20n via, for example, an LAN. Communication lines for linking the respective elements may be a wire or a wireless type.

Each of the devices configuring the imaging system shown in FIG. 1 will be described in detail.

The image forming apparatus 1 is realized by, for example, an MFP (Multi-Function Peripheral). In detail, the image forming apparatus 1 includes, for example, an image read-out unit R, an image forming unit P, a CPU 801, a memory 802, an operation entry unit 803 and a display unit 804.

The image forming apparatus 1 forms an image based on image data of an original document scanned by the image read-out unit R or image data which the image forming apparatus 1 obtains from other external devices or a storage medium such as a flash memory or the like.

The operation entry unit 803 may consist of, for example, a keyboard, a mouse, a touch panel, a touchpad, a graphics tablet or the like.

The display unit 804 may consist of, for example, an LCD (Liquid Crystal Display), an EL (Electronic Luminescence), a PDP (Plasma Display Panel), a CRT (Cathode Ray Tube) or the like.

In addition, functions of the operation entry unit 803 and the display unit 804 can be realized by so-called a touch panel display.

The CPU 801 conducts a variety of processings in the image forming apparatus 1 and also realizes a variety of functions by executing programs stored in the memory 802. The memory 802 may consist of, for example, a RAM (Random Access Memory), a ROM (Read Only Memory), a DRAM (Dynamic Random Access Memory), an SRAM (Static Random Access Memory), a VRAM (Video RAM) or the like and stores lots of information and programs used by the image forming apparatus 1.

The image forming unit P prints and outputs image data scanned by the image forming apparatus 1, data for which the image forming apparatus 1 performs an imaging, data which the image forming apparatus 1 receives from an external device or a storage medium, or the like, on a recording medium such as paper and the like.

FIG. 1 shows that a plurality of communication terminals 201 to 20n are PCs (Personal Computers) as an example. Of course, the present invention is not limited thereto, but may employ terminal devices (also including, for example, an imaging device, an image forming device, an image read-out device and the like) which can communicate with the image forming apparatus 1 and can be setting targets such as a filtering or the like in the image forming apparatus 1.

The database 3 stores results processed by the image forming apparatus 1 or the communication terminals 201 to 20n, and a variety of information used by the image forming apparatus 1 or the communication terminals 201 to 20n, and so on.

Subsequently, functions of the setting operation support device with which the image forming apparatus 1 is equipped according to the first embodiment of the present invention will be described in detail.

Figure 2:
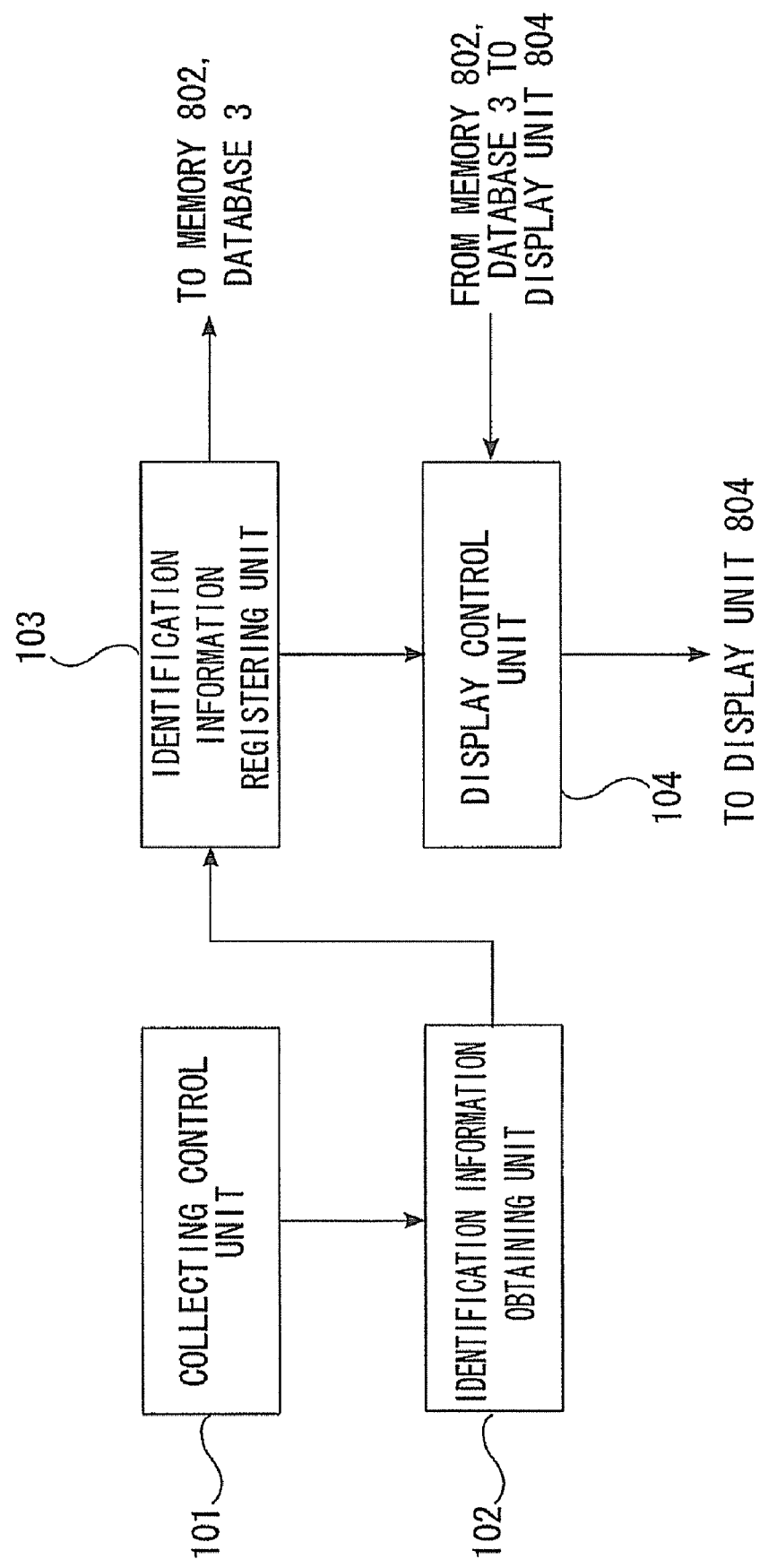
FIG. 2 is a functional block diagram for explaining the setting operation support device according to the first embodiment of the present invention.

FIG. 2 is a functional block diagram for explaining the setting operation support device according to the first embodiment of the present invention. The setting operation support device according to the first embodiment of the present invention includes a collecting control unit 101, an identification information obtaining unit 102, an identification information registering unit 103 and a display control unit 104.

Hereinafter, each of the functions of the setting operation support device according to the first embodiment of the present invention will be described in detail.

The collecting control unit 101 enables the CPU 801 to transmit an ARP request by broadcast via an LAN to conduct a collecting, in order to collect identification information for individually identifying the communication terminals 201, 202, . . . , 20n on a network.

As such, the transmission of the ARP (Address Resolution Protocol) request can obtain an MAC address from an IP address of a reception destination.

Here, the MAC (Media Access Control) address refers to a physical address unique to a hardware of a network device such as an LAN card or the like, set for identifying each node on a network.

The identification information obtaining unit 102 obtains an MAC address (identification information collected by the collecting) sent back from a communication terminal communicably connected via a network according to the ARP request. The obtained MAC address is linked with the IP address transmitted at the time of the ARP request to be stored in the memory 802 or the database 3 or the like as a table data.

The identification information registering unit 103 registers the MAC address obtained by the identification information obtaining unit 102 with the memory 802 or the database 3 as identification information of a plurality of communication terminals 201 to 20n which are management targets.

The display control unit 104 displays a setting screen related to a filtering setting regarding the communication terminals 201 to 20n based on the obtained MAC address, in a state of reflecting the MAC address registered by the identification information registering unit 103.

The "filtering" herein means, for example, when a communication terminal accesses to an image forming apparatus (use of a network scan function, use of a network printer function, data transmission to an image forming apparatus, obtaining of data stored in an image forming apparatus and the like), a screening of allowing a specific terminal and rejecting other terminals is performed.

Processing flows in the setting operation support method according to the first embodiment of the present invention will now be described.

Figure 3:
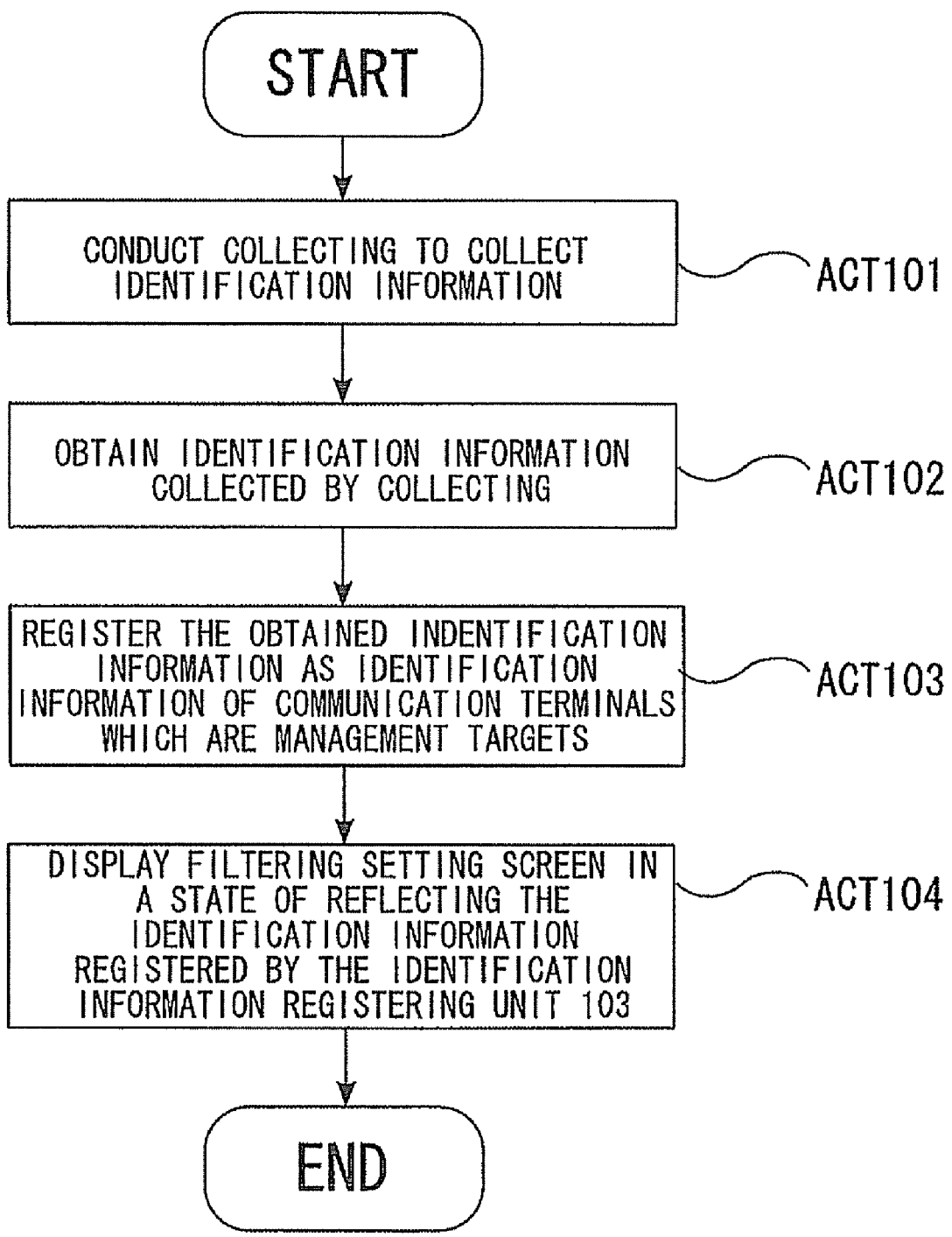
FIG. 3 is a flow chart to illustrate processing flows in the setting operation support device according to the first embodiment of the present invention.

FIG. 3 is a flow chart to illustrate processing flows in the setting operation support device according to the first embodiment of the present invention.

The collecting control unit 101 enables the CPU 801 to collect identification information for individually identifying a communication terminal communicably connected via a network, on the network (ACT 101).

The identification information obtaining unit 102 obtains the collected identification information by the collecting (ACT 102). FIG. 4 is a view to illustrate an example of identification information obtained by an identification information obtaining unit 102 according to the first embodiment. Such obtained identification information can be displayed, for example, on a screen of the display unit 804.

The identification information registering unit 103 registers the identification information obtained by the identification information obtaining unit 102 as identification information of communication terminals which are management targets (ACT 103).

The display control unit 104 displays a setting screen related to a filtering setting regarding a communication terminal based on the identification information on the screen of the display unit 804, in a state of reflecting the identification information registered by the identification information registering unit 103 (ACT 104).

Figure 5:
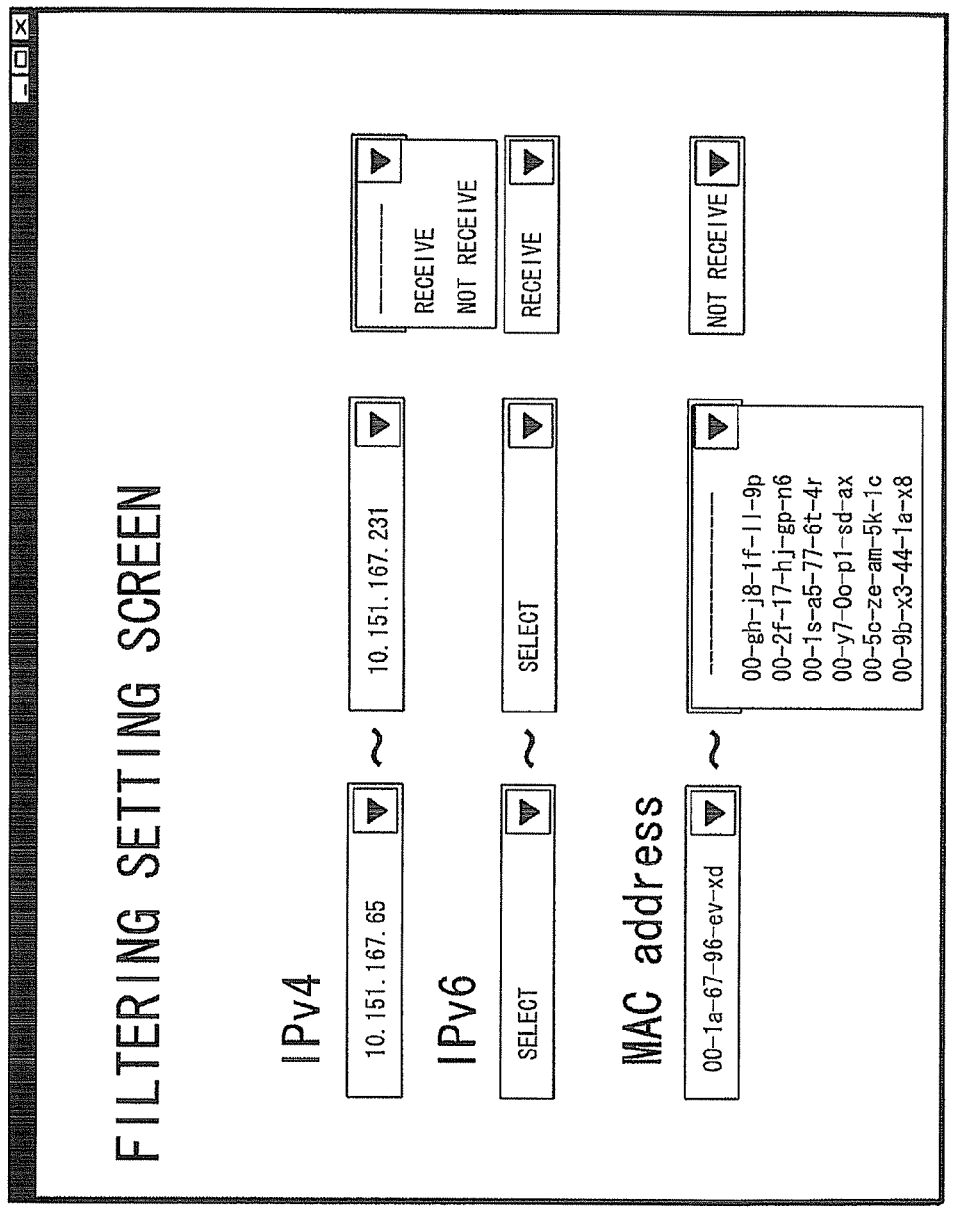
FIG. 5 is a view to illustrate an example of a setting screen regarding a filtering, displayed on the screen by the display control unit 104.

FIG. 5 is a view to illustrate an example of a setting screen regarding a filtering, displayed on the screen by the display control unit 104.

On the setting screen shown in FIG. 5, a setting is possible as to whether or not to receive a request for print or a request for a network scan from the communication terminal to the image forming apparatus 1 by a filtering. The set information here is stored in, for example, the memory 802 or the database 3.

In addition, as shown in FIG. 5, information for specifying a terminal which is a setting target of a filtering can be selected in a pull-down menu type in advance; and thus need not be entered manually.

Furthermore, a user can edit (for example, extract only a header of an IP address or private information of an MAC address or the like) the identification information selected through the pull-down menu on the setting screen shown in FIG. 5 by operating the operation entry unit 803. Thereby, it is possible to more flexibly conduct a specific work for a communication terminal which is a filtering target.

The respective operations at the processings in the above-described setting operation support device are realized by the CPU 801 executing a setting operation support program stored in the memory 802.

As such, according to the present embodiment, since the identification information of the communication terminal connected to the image forming apparatus 1 via a network can be automatically collected, an IP address or an MAC address for specifying a communication terminal which is a filtering target need not be entered manually at the time of setting a filtering; thus, it is possible to contribute to reduction of a load of a setting operation and improvement of accuracy of information entry.

(Second Embodiment)

A second embodiment of the present invention will now be described.

The second embodiment of the present invention is a modification of the first embodiment described above. The present embodiment is different from the first embodiment in a method of obtaining identification information from a communication terminal. Hereinafter, elements having the same functions as those described in the first embodiment are given the same reference numerals, the description of which will be omitted.

In detail, the collecting control unit 101 transmits a neighbor solicitation command in an IPv6 via an LAN, in the present embodiment.

The identification information obtaining unit 102 obtains an MAC address sent back according to the neighbor solicitation command from a communication terminal communicably connected via a network. FIG. 6 is a view to illustrate an example of identification information obtained by an identification information obtaining unit 102 according to the second embodiment. The obtained identification information is displayed on the screen of the display unit 804 for checking contents thereof.

The neighbor solicitation is a function used for a neighbor discovery in the IPv6 (Internet Protocol version 6).

The neighbor discovery collects MAC addresses of neighbors on the same segment (local-link), by use of an "ICMP message" and a "solicited-node multi-cast address."

(Third Embodiment)

A third embodiment of the present invention will now be described.

The third embodiment of the present invention is a modification of the first embodiment described above. The present embodiment is different from the first embodiment in a method of obtaining identification information from a communication terminal. Hereinafter, elements having the same functions as those described in the first embodiment are given the same reference numerals, the description of which will be omitted.

The collecting control unit 101 according to the present embodiment enables the CPU 801 to conduct plural kinds of collectings corresponding to identification information based on each of plural different kinds of protocols.

The identification information obtaining unit 102 obtains identification information in plural kinds of protocols collected by plural kinds of collectings based on the respective plural kinds of protocols.

In detail, the collecting control unit 101 according to the present embodiment enables the CPU 801 to collect plural kinds of identification information (or identification information obtained based on plural collecting methods) such as an MAC address obtained by transmitting an ARP request by broadcast, an MAC address obtained by transmitting a neighbor solicitation command in an IPv6, a NetBIOS name as identification information of a communication terminal on a network using the NetBIOS (Network Basic Input Output System), an address as identification information of a communication terminal on a network using the Appletalk, an IPX address as identification information of a communication terminal on a network using the IPX (Internetwork Packet exchange) and the like.

As such, the identification information of a communication terminal is obtained based on plural kinds of protocols. Thus, it is possible to increase a success rate of obtaining identification information of a communication terminal by trying to obtain identification information of a communication terminal, of which identification information seemingly cannot be obtained based on a specific protocol, based on other protocols.

(Fourth Embodiment)

A fourth embodiment of the present invention will now be described.

The fourth embodiment of the present invention is a modification of the first embodiment described above. The present embodiment is different from the first embodiment in a method of obtaining identification information from a communication terminal. Hereinafter, elements having the same functions as those described in the first embodiment are given the same reference numerals, the description of which will be omitted.

The collecting control unit 101 sets a promise cath mode which is an operation mode of a network card to ON in the image forming apparatus 1.

Here, the "promise cath mode" is one of operation modes of the network card and receives all of the packets running through a network for read-out.

The present embodiment collects identification information by receiving a packet transmitted from a communication terminal connected to the image forming apparatus 1 via a network, by use of such promise cath mode.

A collecting instruction from the collecting control unit in the above-described embodiment may be made at a predetermined time point (for example, 12:00 every day) or at a predetermined timing (for example, upon working of the image forming apparatus), or may be made when a processing load of the image forming apparatus is in a predetermined level or less (so-called an idling state or the like). Especially, a configuration where identification information is collected when the image forming apparatus is in an idling state shows an effect of reducing influence which an operational load due to a collection of identification information has on a processing in the image forming apparatus.

In addition, although the above-described embodiments exemplify a case of employing the ARP request in the IPv4 or the neighbor solicitation command in the IPv6 as a method of obtaining identification information on a network of a communication terminal connected to the network, the present invention is not necessarily limited thereto, but it is obvious that, for example, an ICMP (Internet Control Message Protocol) in the IPv4 may be employed.

Although the above-described embodiments exemplify the configuration where a plurality of communication terminals are communicably connected to the image forming apparatus via the LAN, the present invention is not necessarily limited thereto. For example, the present invention is applicable under an environment where the image forming apparatus can finally collect identification information of a communication terminal which is a filtering target, and it is obvious that a plurality of communication terminals may be communicably connected to the image forming apparatus via the Internet or a WAN.

Further, although the above-described embodiments exemplify the configuration where the identification information of a communication terminal obtained by the identification information obtaining unit is stored in, for example, the memory 802 or the database 3, data table of the identification information stored in the memory 802 or the database 3 in this way can be refreshed. As such, it is possible to grasp identification information of a communication terminal connected to a network in a latest state at all times by periodically refreshing the data table of identification information and collecting identification information.

In addition, storage regions for storing identification information in the memory 802 or the database 3 are preferably varied based on a user's operation entry or the like.

The program to execute the above-described respective operations can be provided as a setting operation support program in a computer configuring the setting operation support device. Although the present embodiments exemplify that the corresponding program for realizing a function to embody the invention is pre-recorded in a storage region provided inside the apparatus, not limited thereto, the same program may be downloaded to the apparatus over a network or the same program stored in a computer readable recording medium may be installed in the apparatus. A recording medium may be of any types if only it can store a program and is computer readable. In detail, the recording medium includes, for example, an internal storage device embedded in a computer such as a ROM, a RAM or the like, portable recording media such as a CD-ROM, a flexible disc, a DVD disc, a magneto-optical disc or an IC card, a database to preserve computer programs, or a transmission medium on other computers and a database thereof or a line, or the like. In addition, a function obtained by installment or download in advance may be realized in cooperation with an OS (operating system) of the apparatus.

In addition, the program according to the present embodiments is assumed to contain a program which dynamically generates an executable module.

Various modifications and alterations of this invention will be apparent to those skilled in the art without departing from the scope and spirit of this invention, and it should be understood that this is not limited to the illustrative embodiments set forth herein.

As described above in detail, according to the present invention, it is possible to provide a technique to support a setting operation as to a processing performed using identification information of a communication terminal on an associated network, in the communication terminal connected via the network.

What is claimed is:

1. An image forming apparatus comprising:
    a collecting control unit configured to enable a processor to conduct a collecting of identification information for individually identifying communication terminals communicably connected via a network, on the network;
    an identification information obtaining unit configured to obtain identification information collected by the collecting;
    an identification information registering unit configured to register the identification information obtained by the identification information obtaining unit as identification information of communication terminals which are management targets; and
    the collecting control unit is further configured to enable the processor to conduct plural kinds of collectings corresponding to identification information based on each of different plural kinds of protocols, and the identification information obtaining unit is configured to obtain identification information in the plural kinds of protocols collected by the plural kinds of collectings based on the respective plural kinds of protocols.

2. The apparatus according to claim 1, further comprising a display control unit configured to display a setting screen related to a filtering setting regarding the communication, terminals based on the identification information in a state of reflecting the identification information registered by the identification information registering unit.

3. The apparatus according to claim 1, wherein the collecting control unit is configured to enable the processor to transmit an ARP request by broadcast via the network, and the identification information obtaining unit is configured to obtain an MAC address sent back from a communication terminal communicably connected via the network according to the ARP request.

4. The apparatus according to claim 1, wherein the collecting control unit is configured to enable the processor to transmit a neighbor solicitation command in the Ipv6 via the network, and the identification information obtaining unit is configured to obtain an MAC address sent back from a communication terminal communicably connected via the network according to the neighbor solicitation command.

5. The apparatus according to claim 1, wherein the identification information obtaining unit is configured to obtain at least one of a NetBIOS name as identification information of a communication terminal on a network using a NetBIOS, an address as identification information of a communication terminal on a network using an Appletalk and an IPX address as identification information of a communication terminal on a network using an IPX.

6. The apparatus according to claim 1, wherein the collecting control unit is configured to set a promise cath mode which is an operation mode of a network card to ON.

7. A setting operation support method comprising:
    enabling a processor to conduct a collecting of identification information for individually identifying communication terminals communicably connected via a network, on the network;
    obtaining identification information collected by the collecting;
    registering the obtained identification information as identification information of communication terminals which are management targets; and
    enabling the processor to conduct plural kinds of collectings corresponding to identification information based on each of different plural kinds of protocols, and obtaining identification information in the plural kinds of protocols collected by the plural kinds of collectings based on the respective plural kinds of protocols.

8. The method according to claim 7, further comprising displaying a setting screen related to a filtering setting regarding the communication terminals based on the identification information in a state of reflecting the registered identification information.

9. The method according to claim 7, further comprising enabling the processor to transmit an ARP request by broadcast via the network, and obtaining an MAC address sent back from a communication terminal communicably connected via the network according to the ARP request.

10. The method according to claim 7, further comprising enabling the processor to transmit a neighbor solicitation command in the Ipv6 via the network, and obtaining an MAC address sent back from a communication terminal communicably connected via the network according to the neighbor solicitation command.

11. The method according to claim 7, further comprising obtaining as the identification information at least one of a NetBIOS name as identification information of a communication terminal on a network using a NetBIOS, an address as identification information of a communication terminal on a network using an Appletalk and an IPX address as identification information of a communication terminal on a network using an IPX.

12. The method according to claim 7, further comprising setting a promise cath mode which is an operation mode of a network card to ON to conduct the collecting.

13. A non-transitory computer readable medium storing a setting operation support program for enabling a computer to:
enable a processor to conduct a collecting of identification information for individually identifying communication terminals communicably connected via a network, on the network;
obtain identification information collected by the collecting;
register the obtained identification information as identification information of communication terminals which are management targets; and
enable the computer to enable the processor to conduct plural kinds of collectings corresponding to identification information based on each of different plural kinds of protocols, and to obtain identification information in the plural kinds of protocols collected by the plural kinds of collectings based on the respective plural kinds of protocols.

14. The non-transitory computer readable medium according to claim 13, further enabling the computer to display a setting screen related to a filtering setting regarding the communication terminals based on the identification information in a state of reflecting the registered identification information.

15. The non-transitory computer readable medium according to claim 13, further enabling the computer to enable the processor to transmit an ARP request by broadcast via the network, and to obtain an MAC address sent back from a communication terminal communicably connected via the network according to the ARP request.

16. The non-transitory computer readable medium according to claim 13, further enabling the computer to enable the processor to transmit a neighbor solicitation command in the Ipv6 via the network, and to obtain an MAC address sent back from a communication terminal communicably connected via the network according to the neighbor solicitation command.

17. The non-transitory computer readable medium according to claim 13, further enabling the computer to set a promise cath mode which is an operation mode of a network card to ON to conduct the collecting.

* * * * *